United States Patent [19]

Hatter

[11] Patent Number: 5,011,352
[45] Date of Patent: Apr. 30, 1991

[54] DEFLECTION TYPE THREAD LOCK FOR A THREADED FASTENER

[75] Inventor: Edwin E. Hatter, Torrance, Calif.
[73] Assignee: Hi-Shear Corporation, Torrance, Calif.
[21] Appl. No.: 404,697
[22] Filed: Sep. 8, 1989
[51] Int. Cl.⁵ .............................................. F16B 39/02
[52] U.S. Cl. ........................................ 411/271; 411/4; 411/277; 411/360; 411/937.2
[58] Field of Search ........................ 411/271, 276–279, 411/360, 361, 937.2, 1, 2, 3, 336

[56] References Cited

U.S. PATENT DOCUMENTS

| | | | |
|---|---|---|---|
| 1,031,978 | 7/1912 | Ainslie | 411/271 |
| 1,438,104 | 12/1922 | Farrell | 411/271 |
| 3,138,987 | 6/1964 | Wing | 411/4 |
| 3,602,976 | 9/1971 | Grube | 411/2 X |
| 3,925,876 | 12/1975 | Curtis | 411/271 X |

FOREIGN PATENT DOCUMENTS

| | | | |
|---|---|---|---|
| 399739 | 7/1909 | France | 411/279 |
| 1455176 | 11/1976 | United Kingdom | 411/277 |

Primary Examiner—Robert L. Wolfe
Assistant Examiner—Suzanne L. Dino
Attorney, Agent, or Firm—Donald D. Mon

[57] ABSTRACT

A fastener includes a threaded pin and an internally threaded collar. The threads can freely be run without impediment during tightening. After the fastener is tightened, a tool engages a shoulder on the collar and presses a deflector against the collar on the pin to deflect it so as to form a lock against loosening.

8 Claims, 2 Drawing Sheets

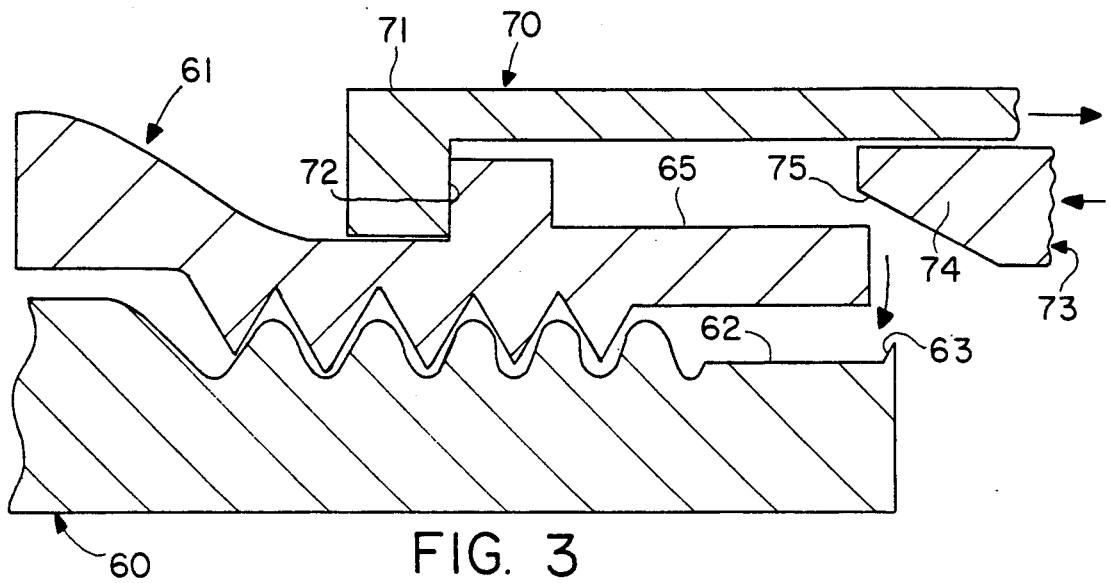
FIG. 3
FIG. 4
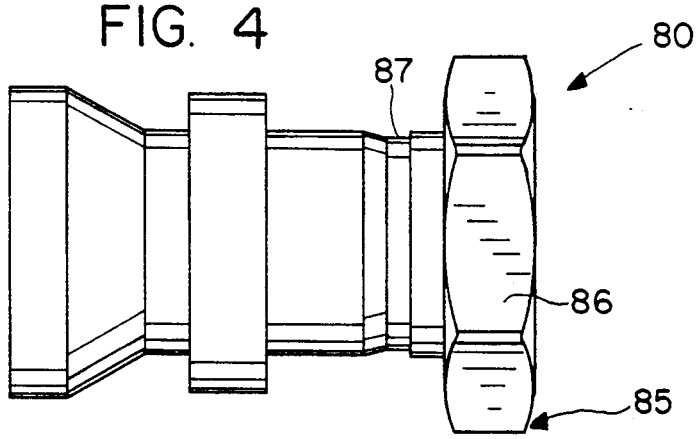
FIG. 5
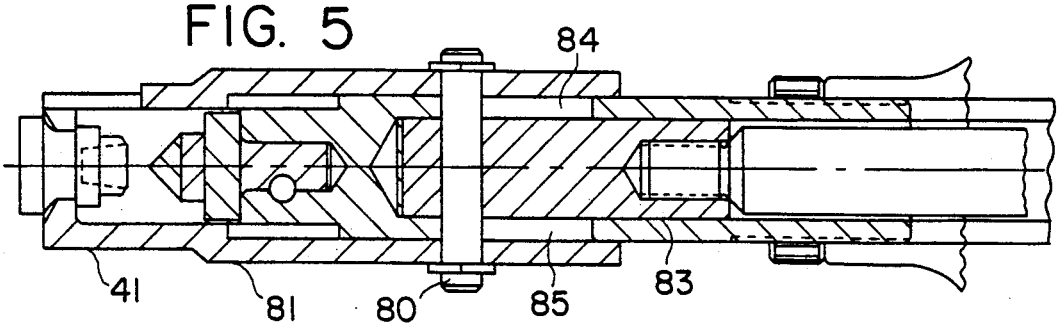

DEFLECTION TYPE THREAD LOCK FOR A THREADED FASTENER

FIELD OF THE INVENTION

This invention relates to locking a free spinning internally threaded collar onto an externally threaded pin, by radial displacement of collar or pin material into the path of the thread on the pin or collar.

BACKGROUND OF THE INVENTION

A pervasive problem in threaded fasteners is to prevent a threaded collar that has been tightened onto a threaded pin from coming loose in use. Locknuts, lock washers, adhesives, and out-of-round collar sections are well-known means for resisting the tendency of a collar to work loose.

While each of the known lock means meets the locking requirement at least to some extent, they generally present limitations and introduce problems of their own.

It is an object of this invention to add to the collar-locking resources a fastener structure, tool, and method which does not require additional structural pieces such as lock washers, critical dimensions in the production article to produce a locking action, or foreign substances such as adhesives. A simple localized distortion of a structurally unimportant portion of the pin or collar, after tightening down the collar, is all that is needed.

This invention employs an externally threaded pin and an internally threaded collar. Their threads are so shaped and proportioned that the collar can be run freely onto the pin and tightened down without impediment. Known thread lock arrangements often include lock means which react while the collar is being run down. As a consequence, the torque actually applied between the threads, and the resulting axial preload in the resulting joint, are rendered uncertain. An example of such prior arrangements is prevailing lock arrangements where the collar is initially pressed out of round, and the forces generated by its restoration to round out the collar are the prevailing forces. Another example is where a lip on the collar is swaged into a groove on the pin by an adjacent face of a washer while the collar is being tightened down. These are useful and effective devices, but they do suffer from the coincidence of the torquing and locking functions.

It is an object of this invention to provide a threaded system that can be freely tightened, and then, after the desired torque is attained, the system can be locked without disturbing the applied torque level, or the axial pre-load.

BRIEF DESCRIPTION OF THE INVENTION

This invention utilizes an externally threaded pin and an internally threaded collar. The threads are proportioned to enable the collar freely to be run down and tightened onto the pin. The pin has a reduced cross-section at or near its end, which can either be radially enlarged to impede the unthreading of the collar, or which has means to receive a radially reduced portion of the collar, also to impede the unthreading of the collar.

The collar is provided with a shoulder for engagement by one part of a compression tool. The tool has a shoulder to engage the shoulder on the collar, and deflection means to deflect a portion of the pin or of the collar to make the lock.

In the preferred embodiment of the invention, a recess is formed in the threaded end of the pin to form the reduced cross-section and to receive the deflection means in the form of an expander on the tool to enlarge the end of the pin.

In another embodiment of the invention, the pin has an external groove to reduce the pin cross section, and the deflection means exerts a compressive action to deflect a portion of the collar into the groove to form the thread lock.

The above and other features of this invention will be fully understood from the following detailed description and the accompanying drawings, in which:

BRIEF DESCRIPTION OF THE DRAWINGS

FIG. 3 is an axial cross-section of another embodiment of the invention;

FIG. 4 is a side view of another type of collar useful with this invention;

FIG. 5 is an axial section of a tool useful in the use of this invention.

DETAILED DESCRIPTION OF THE DRAWINGS

Figure 1:
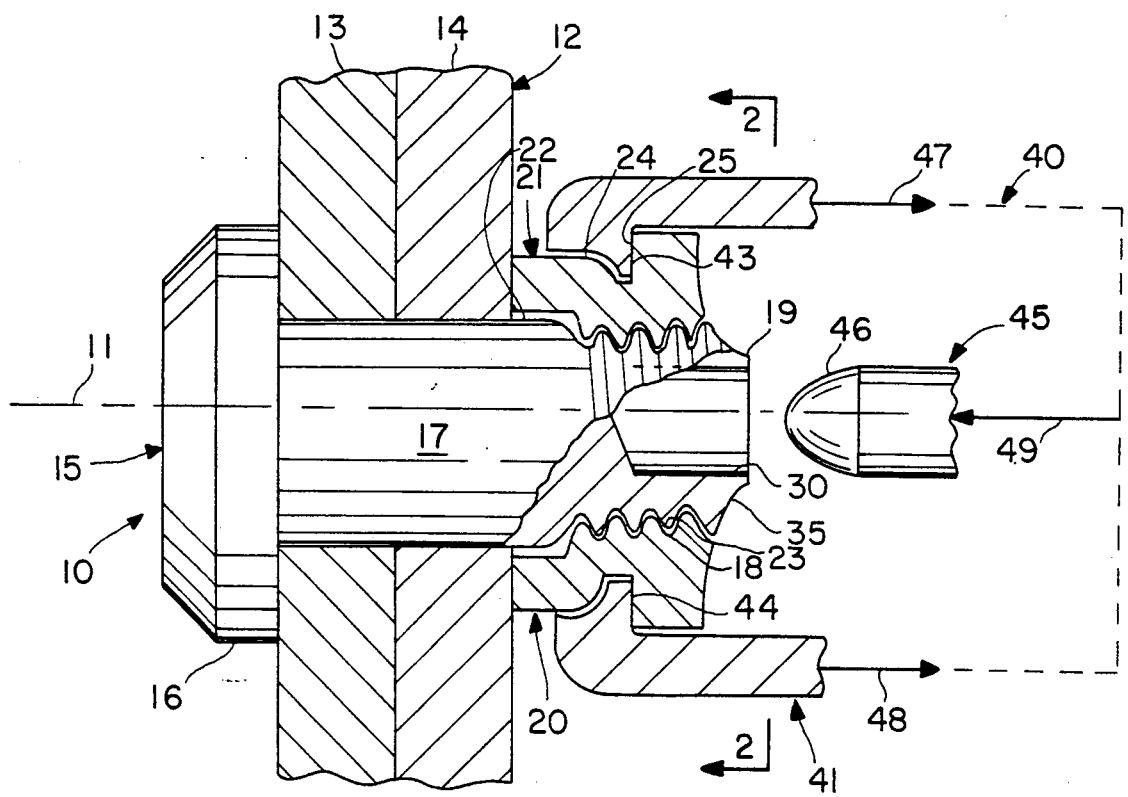
FIG. 1 is an axial view, partly in cutaway cross-section, showing the presently preferred embodiment of the invention.

FIG. 1 shows a fastener 10 which has a central axis 11, being set in a workpiece 12. Workpiece 12 is shown as a pair of flat contiguous metal sheets 13, 14, although this is not a limitation on the utility of the invention. The fastener can fasten any appropriate articles together.

Fastener 10 includes a pin 15 having a head 16, a shank 17 and an external thread 18 at its free end 19.

A collar 20 has a peripheral body 21, and a central passage with a counterbore 22 and an internal thread 23. Its exterior surface 24 includes a peripheral shoulder 25 facing toward the workpiece.

As it happens, and will later be described in FIG. 4 the fastener before installation can include an optional non-circular drive section which is engaged by a wrench. It will shear off when sufficient torque is exerted, and will leave a round structure set on the pin to a correct torque and axial pre-load.

Figure 2:
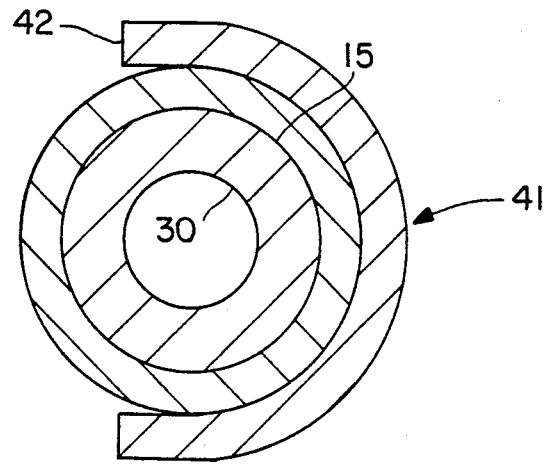
FIG. 2 is an end view of FIG. 5.

However, the round outside structure of the collar illustrated in FIGS. 1 and 2 shows the generality of this invention. A common hexagonal or square nut with a flat end and a corresponding shoulder could instead be used on the body. It is not necessary to include a torque-off driving section because this feature is optional. The terms "nut" and "collar" are used interchangeably in this specification.

What is important to this embodiment is that when the collar is installed, there is a short length of pin (exposed segment 35) beyond it, often a threaded length, but not necessarily so. Preferably the length of this segment is at least one full thread convolution, which can be radially enlarged to make the thread lock. If it is not threaded, about this much length will usually be needed.

A recess 30, which may be circular at its open end, but need not be circular is formed in the free end of the pin to reduce the cross-section of the pin at that location. The recess is centered on the central axis. Its depth is sufficient to enable a radial enlargement of the pin at its free end to be made. Preferably the recess will not extend so deeply into the pin that there do not remain in the assembled fastener at least three fully formed pin thread convolutions. In high performance assemblies, engagement of three fully formed pin and collar thread convolutions without penetration of the recess to that depth is desirable. In joinders of less criticality, this limitation is generally not asserted.

Whatever the situation, the collar will be freely tightened down onto the pin and set to a given torque to assemble the workpiece. As shown in FIG. 1, this will leave an exposed segment 35 of the free end of the pin, bearing some thread. Of course the end portion need not be threaded—it could be a cylindrical extension instead, except that this complicates an otherwise simple pin.

Now tool 40 is applied. The tool as schematically shown has a fork 41 (pulling means) formed as a cutaway portion 42 which gives side access to an internal groove 43 with a bearing face 44 that bears against shoulder 25 of the collar when the tool is moved into place. The tool further includes deflector means 45 which when the tool is in place with the bearing face and shoulder in respective abutment, is brought into contact with the end of the pin. In the embodiment shown, deflector means 45 is a frustoconical expander whose diameter increases as it extends away from the free end of the pin.

Power means or lever means (not shown) moves the expander in compressive opposition on the pin, in opposition to the reacting force on the shoulder of the collar. The expander has a tapered nose 46 that enters the pin recess and contacts the end of the pin at the free end of the recess. When the fork and the expander are axially pressed toward one another as shown by arrows 47, 48 and 49, the expander will radially expand the projecting exposed segment 35 of the thread. It will radially locally expand and deform the end of the pin thread so the collar cannot readily be unthreaded past it. Depending on the relative strengths of the exposed pin section and of the collar thread, it may permanently prevent removal, or may merely be an impediment to its ready removal. These considerations are well within the capacity of a competent designer to accommodate.

As best shown in FIG. 5, a cross-pin 80 extends across a tubular element 81 which carries fork 41. It also passes through an expander mount 83, and fits in axial slots 84, 85 which permit relative axial movement of the mount and the tube, and thereby of the expander and the puller.

It will be noted that the deformation of material is at the free end of the pin, where one does not look for thread strength. Thus, this local deformation serves a useful function without diminishing the function of the fastener itself. It does not affect the torque level, or the axial pre-load.

FIG. 3 illustrated another embodiment of the invention. In this embodiment an external threaded pin 60 and an internally threaded collar 61 are assembled as shown in FIG. 1, as free-spinning elements without impediment. In this embodiment, however, the pin's cross-section is reduced by an external groove 62 which has a shoulder 63 facing toward the headed end of the pin. It does not need a recess in its end to reduce the section, but one may be provided for unrelated reasons.

Also, the collar is provided with a cylindrical lip 65 which faces away from the workpiece. The collar has a bearing face 66 as in FIG. 1.

A tool 70 for this embodiment has the same fork 71 and engagement face 72 as in FIG. 1. However, instead of an expander, it has a wedge-shaped internal deflector 73 which will reduce a collar dimension. It is a cylindrical body 74 with an internal bell-mouth deflector surface 75. When fork 71 and body 74 are moved compressively as shown, the lip will be permanently deflected into the groove, and when an unthreading effort is made, it will bear against shoulder 63, to frustrate removal of the collar from the pin.

These are both convenient post-installation procedures which can quickly and conveniently be accomplished. The resulting appearance of the set fastener gives evidence that the thread lock has been applied.

The embodiments have in common that a cross-section of the pin has been locally reduced, and that a portion of either the collar or of the pin has been deflected to form a thread lock.

The terms collar and pin are used synonymously with the terms nut and bolt. The term pin also comprehends an unthreaded part, such as a stud.

Instead of the fork arrangement shown, a collet could be utilized with fingers which have engagement surfaces to be brought against the shoulder on the collar body.

The collar 80 shown in FIG. 4 provides advantages beyond those of a simple nut. It includes the torque-limiting feature of the well-known Hi-Lok fastener which is the subject of George S. Wing U.S. Pat. No. 2,940,495, issued June 14, 1960. This Wing patent is incorporated herein in its entirety by reference for its showing of a torque limited collar whose applicable torque is limited by a frangible section which fractures at a predetermined torque.

Collar 80 is in all ways identical to collar 20, except that it includes a driver section 85 with a hexagonal array 86 of tool-engaging surfaces. A torque tool can be placed on this array to drive the collar. A torque-off groove 87 is formed in the collar, and represents the cross-section having least resistance to torque on the collar. When a sufficient torque is exerted, the driver section will shear off, leaving assembled to the pin the remainder of the collar to the left of it in FIG. 4, set at a known torque what remains will be recognized as the collar of FIG. 3. Of course, the collar in FIG. 3 did not necessarily have to have included a removable driver section. The analogy will be apparent.

This invention is not to be limited by the embodiments shown in the drawings and described in the description, which are given by way of example and not of limitation, but only in accordance with the scope of the appended claims.

We claim:
1. A fastener having a central axis comprising:
a pin having a shank, a free end, an external thread adjacent to its free end, and a reduced cross-section near its free end;
a collar having a body, an axial passage through said body, an internal thread in said passage so proportioned and arranged as to engage the external thread on said pin, said internal and external threads being so shaped, proportioned and arranged that the collar can freely be run onto the pin and tightened down without impediment between said threads, and when said collar is assembled to said pin to leave at least some of said reduced cross-section exposed beyond said collar;

said body having a shoulder so disposed and arranged as to be engageable by pulling means, whereby with the collar tightened onto the pin, said pulling means may be engaged to said shoulder and deflector means may be forced in axial opposition to axial forces exerted by pulling means to deflect an end portion of the pin or of the collar into the axial path of the other to provide a thread lock to resist removal of the collar from the pin.

2. A fastener according to claim 1 in which a recess extends axially into the free end of the pin to form said reduced cross-section, and in which said deflector means is a tapered expander with increasing diameter which partially enters said recess to enlarge the free end of the pin.

3. A fastener according to claim 1 in which said collar, prior to assembly, includes a drive section which torques off when sufficient torque is applied to it, to leave said exposed reduced cross-section clear of the collar.

4. A fastener according to claim 1 in which a groove extends around said pin adjacent to its free end, forming a shoulder facing away from said free end, and in which the collar has a lip projecting toward said free end, said pulling means and deflector means pressing in compressive opposition against said shoulder on the body and on said lip, whereby to deflect said lip into said groove.

5. A method for locally expanding the free end portion of an external thread on a pin, said pin having an axial recess on its free end, and a collar threaded onto it, leaving exposed a segment of said collar at its free threaded end, said collar having an external shoulder, said method comprising: with a tool engaging said shoulder and exerting an axial pull on said shoulder, and with said tool simultaneously forcing a tapered expander into said recess to expand the free end whereby to form a thread lock to resist unthreading of the collar.

6. A tool for upsetting a localized portion of the free end of a pin, said pin being externally threaded and having an internally threaded collar threaded onto it, said tool having a shoulder to engage the collar, an expander with a tapered nose, and means to force the collar in one direction and the expander in the opposite direction.

7. A method for locking an internally threaded collar onto an externally threaded pin, said pin having a peripheral groove adjacent to its free end and said collar having a peripheral lip, said method comprising: with a tool engaging said shoulder and exerting an axial pull on it, and with said tool forcing a deflector against said lip, whereby to deflect the lip into the groove to impede unthreading of the collar from the pin.

8. A tool for deflecting a localized portion of the free end of a threaded collar into a peripheral groove on an externally threaded pin, said tool having a fork with a shoulder facing toward said free end, a deflector means to deflect said lip into said groove, and means to force the fork in one direction and the deflector means in the opposite direction.

* * * * *